2,994,471
AIR SUPPLY UNIT
Gordon Manns Lewis and Peter Frederick Orchard, Bristol, England, assignors, by mesne assignments, to Bristol Siddeley Engines Limited, Bristol, England, a British company
Filed Mar. 10, 1958, Ser. No. 720,220
Claims priority, application Great Britain Mar. 19, 1957
4 Claims. (Cl. 230—116)

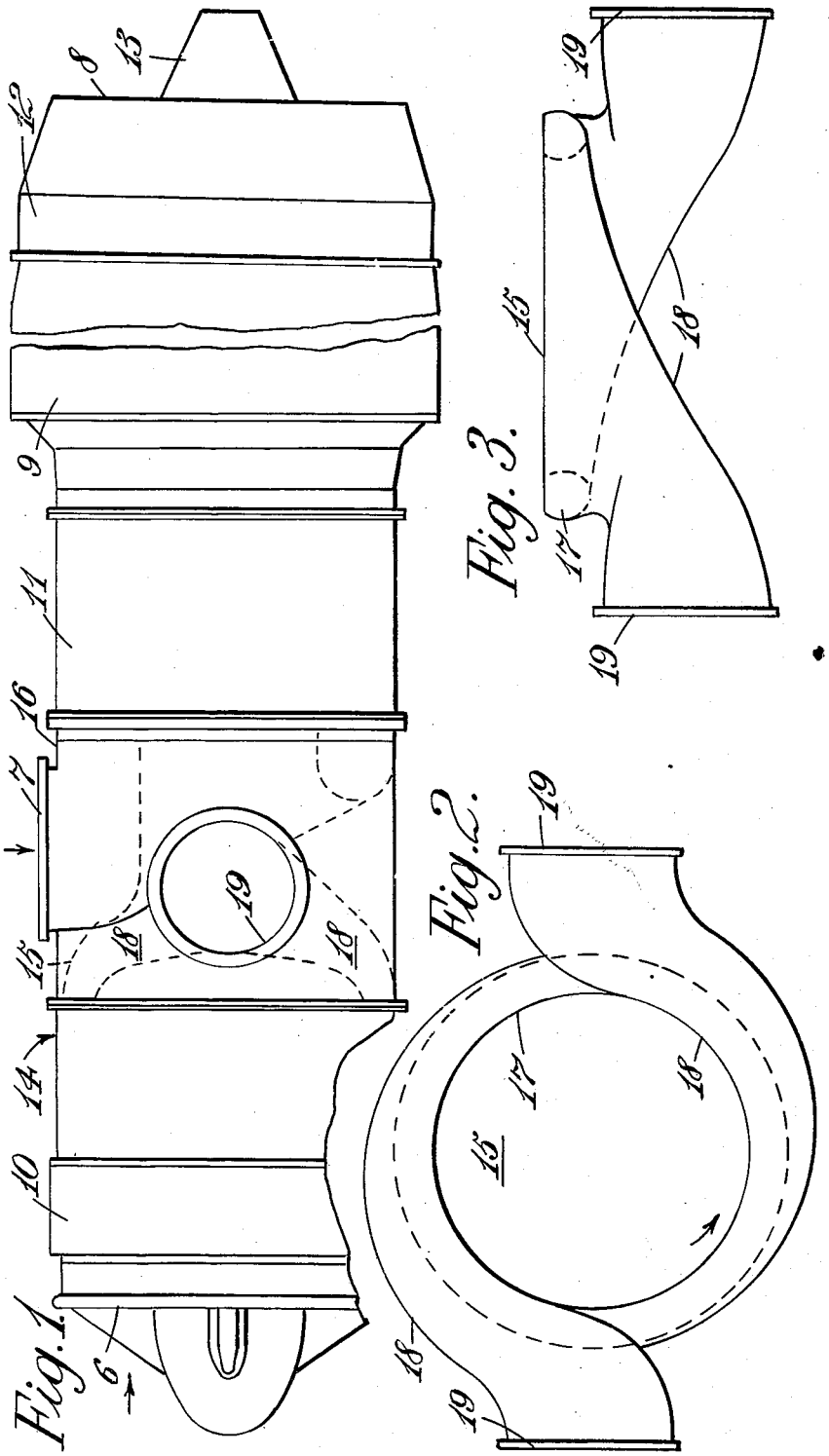

This invention relates to air supply units for supplying substantial quantities of compressed air, and concerns such units which are intended for use in aircraft, for example, for blowing air over the wing control surfaces of the aircraft. However, a unit according to the invention has other applications in and other uses than in aircraft, and the term "air" as used in this specification is intended to include any gaseous medium.

According to the invention an air supply unit comprises an axial flow load compressor, a gas turbine engine having an axial flow compressor, said engine being connected to drive said load compressor, and said load compressor being arranged coaxially with the axial flow compressor of said engine and on the side thereof remote from the turbine system of the engine, and deflection ducting connected to receive the discharge from said load compressor, and to deflect the discharge outwardly in a lateral direction with respect to the axis of the load compressor, said ducting being located between said load compressor and said engine.

According to a feature of the invention, the turbine system of the engine may comprise a single turbine, in which case the turbine is connected to drive the engine compressor and the load compressor.

When this feature is adopted it is preferred that the engine compressor and the load compressor have matching flow characteristics and are each connected to be driven directly by said turbine, for example through a common driving shaft. In this way the complication of reduction gearing is avoided.

The turbine system may, however, according to an alternative feature of the invention, comprise a pair of mechanically independent turbines one of which is connected to drive the engine compressor and the other of which is connected to drive the load compressor.

In the case of an air supply unit according to the invention intended for use in an aircraft, it is preferred that said engine is a gas turbine jet propulsion engine. The air supply unit may then be used to propel the aircraft as well as supply air for purposes which may include propulsion.

According to another feature of the present invention, the load compressor may have a straight annular air intake duct arranged co-axially with the load compressor, and the engine compressor may have an air intake located between said deflection ducting and the engine compressor. Where the unit is incorporated in an aircraft the air intake duct for the load compressor may lead from a forwardly facing annular air intake of the kind normally associated with the engine compressor.

According to another feature of the invention, the deflection ducting may comprise an annular portion co-axial with the load compressor and connected to receive directly through an annular outlet from the load compressor air compressed in the load compressor, at least one laterally directed discharge passage, and for each discharge passage a part spiral passage winding from said annular portion to the discharge passage in the direction of rotation of the load compressor. This arrangement of the ducting utilises the swirl of the air discharged by the load compressor to minimise the change of direction which the deflection ducting has to impart to the air discharging from the load compressor in order to deflect it outwardly in the lateral direction.

One embodiment of the present invention will now be described, merely by way of example, with reference to FIGURE 1 is a diagrammatic side elevation of an air supply unit according to the invention intended for use in an aircraft, FIGURE 2 is an end elevation on a larger scale of the deflection ducting, and FIGURE 3 is a sectional elevation corresponding to FIGURE 2.

Referring to FIGURE 1, the unit comprises a gas turbine jet propulsion engine comprising an axial flow compressor 11, a combustion system 9 and a turbine system 12. The jet stream issuing from the turbine system emerges through an annular outlet 8 around an exhaust cone 13, and, when the unit is installed in an aircraft would be directed into a jet pipe terminating in a jet propulsion nozzle.

The air supply unit further comprises an axial flow load compressor 14 co-axial with the compressor 11 and on the side thereof remote from the turbine system 12 and deflection ducting 15 connected to receive the discharge from the compressor 14 and to deflect the discharge outwardly in a lateral direction with respect to the axis of the compressor 14. For convenience the term "laterally directed" will hereinafter be used to mean directed laterally with respect to the axis of the compressor 14, and in a similar way the term "axially directed" will be used to mean directed in the direction of the axis of the compressor 14.

The compressor 14 has a straight annular air intake duct 10 arranged co-axially therewith and leading from an axially directed air intake opening 6, and the the compressor 11 has a laterally directed air intake opening 7 opening into an axially directed annular air intake duct 16 co-axial with the engine compressor. The duct 16 is located between the deflection ducting 15 and the compressor 11. The turbine system 12 comprises only a single turbine, and the compressor 14 is coupled to rotate with the compressor 11 which is in turn connected to be driven by the turbine. The compressor 14 and the compressor 11 have matching flow characteristics and are each driven directly by the turbine. By matching the flow characteristics of the two compressors, the compressors can be driven at the same speed and the problems involved by the use of reduction gearing are avoided.

In an alternative arrangement, the turbine system 12 may comprise two mechanically independent turbines arranged in flow series, the high pressure turbine being connected to drive the compressor 11 and the low pressure turbine connected to drive the compressor 14. As will readily be understood the low pressure turbine receives as its working medium the combustion gases discharging from the high pressure turbine, and the two turbines are arranged co-axially with one another, the low pressure turbine driving the compressor 14 by means of a shaft which passes through a hollow drive shaft connecting the high pressure turbine with the compressor 11, and through the compressor 11.

The form of the deflection ducting 15 is shown more clearly in FIGURES 2 and 3 to which reference will now be made. The deflection ducting comprises an annular portion 17 co-axial with the compressor 14 and connected to receive directly through an annular outlet from the compressor 14 air compressed in the compressor 14. Winding from the annular portion 17 in the direction of rotation of the compressor 14 to two laterally directed discharge passages 19 located diametrically opposite one another are two part-spiral diffusers 18.

The direction of winding of the part-spiral diffuser portions 18 is made the same as the direction of rotation of the compressor 14 so as to match the direction of swirl of compressed air discharged from the compressor 14 in order to minimise the deflection which has to be imparted to the discharge by the walls of the diffuser portions in order to deflect the discharge outwardly through the laterally directed discharge passages 19.

In an alternative arrangement, diffuser portions 18 may be dispensed with, and an annular diffuser may be inserted co-axial with the compressor 14, the annular diffuser being connected to receive the discharge of the compressor 14 directly through said annular outlet. In this case the deflection ducting would comprise an annular portion such as 17 communicating with the downstream end of the annular diffuser and one or more laterally directed discharge passages such as 19 communicating directly with the annular portion. The advantage of the part-spiral diffuser arrangement illustrated however is that it is more compact, and does not occupy so much axial space as the alternative arrangement.

The annular air intake duct 16 and the annular portion 17 of the deflection ducting 15 surround the drive shaft of the compressor 14.

Instead of providing two discharge passages 19 and two part-spiral portions 18, there may be a single discharge passage 19 connected with the portion 17 by a single part-spiral passage 18, and furthermore, the single passage 19 may be directed oppositely to the air intake opening 7 instead of at right angles thereto.

An axial flow gas turbine jet propulsion engine may readily be converted into an air supply unit as described, by inserting between the air intake casing of the engine and the compressor casing of the engine a load compressor section, and a section comprising deflection ducting such as 15 and an alternative air intake arrangement for the compressor of the engine, the engine air intake being used to feed the load compressor instead of the engine compressor, and the load compressor being connected to be driven with the engine compressor by an extension drive shaft on the engine compressor.

We claim:

1. An air supply unit comprising a gas turbine engine including an axial flow engine compressor having an air inlet open directly to atmosphere, combustion equipment connected to receive compressed air from the compressor, and a turbine system connected to receive the products of combustion from the combustion equipment, an axial flow load compressor arranged coaxially with the engine compressor and on the side thereof remote from the turbine system of the engine, coupling means drivingly connecting the engine to said load compressor, said load compressor having an annular outlet duct between the engine compressor and the load compressor and encircling the engine axis, and deflection ducting providing a discharge outlet for air compressed in the load compressor, said deflection ducting forming a part-spiral passage which is connected to receive compressed air from the outlet duct of the load compressor and which winds from said annular outlet duct to said discharge outlet in the direction of rotation of the load compressor.

2. An air supply unit as claimed in claim 1, wherein the load compressor has a co-axial straight annular air intake duct leading from an axially directed air intake opening for the load compressor, and the engine compressor has a laterally directed air intake aperture open directly to atmosphere and leading into an axially directed annular air intake duct for the engine compressor located between said deflection ducting and the engine compressor and co-axial with the engine compressor.

3. An air supply unit as claimed in claim 1, wherein said part-spiral passage is shaped to act as a diffuser.

4. An air supply unit comprising a gas turbine engine including an axial flow engine compressor having an air inlet open directly to atmosphere, combustion equipment connected to receive compressed air from the compressor, and a turbine system connected to receive the products of combustion from the combustion equipment, an axial flow load compressor arranged coaxially with the engine compressor and on the side thereof remote from the turbine system of the engine, said load compressor having an annular outlet duct which is disposed between the engine compressor and the load compressor and which encircles the engine axis, deflection ducting providing a discharge outlet for air compressed in the load compressor, said deflection ducting forming a part-spiral passage which is connected to receive compressed air from the outlet duct of the load compressor and which winds from said annular outlet duct to said discharge outlet in the direction of rotation of the load compressor, and a drive shaft drivingly connecting the engine to said load compressor, said drive shaft being encircled by the deflection ducting.

References Cited in the file of this patent

UNITED STATES PATENTS

| 2,582,848 | Price | Jan. 15, 1952 |
|---|---|---|
| 2,650,666 | Dorand et al. | Sept. 1, 1953 |
| 2,696,079 | Kappus | Dec. 7, 1954 |
| 2,823,851 | Shields | Feb. 18, 1958 |
| 2,842,306 | Buchi | July 8, 1958 |

FOREIGN PATENTS

| 757,981 | Great Britain | Sept. 26, 1956 |
|---|---|---|
| 783,880 | Great Britain | Oct. 2, 1957 |